July 5, 1960     J. A. LABBEE, JR     2,943,658
SCREW-TAPER DRILL WITH A DEPTH GAUGE
Filed July 26, 1954
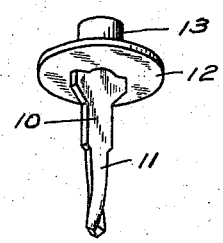
Fig.1
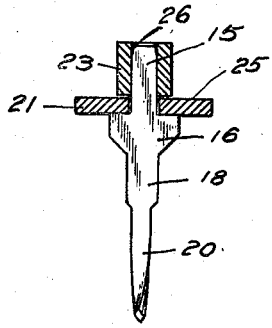 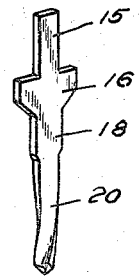 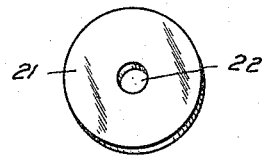
Fig.2     Fig.3     Fig.4
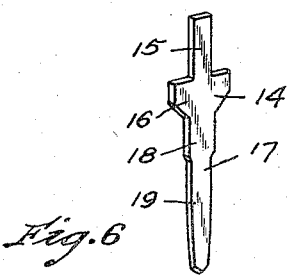 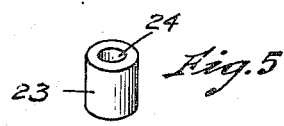
Fig.6     Fig.5
INVENTOR
Joseph A. Labbee, jr
BY Nathaniel Frucht
ATTORNEY

United States Patent Office 2,943,658
Patented July 5, 1960

2,943,658
SCREW-TAPER DRILL WITH A DEPTH GAUGE

Joseph A. Labbee, Jr., Providence, R.I.; Katherine G. Labbee, Box 63, Edgewood 5, R.I., administratrix of said Joseph A. Labbee, Jr., deceased Filed July 26, 1954, Ser. No. 445,714

1 Claim. (Cl. 145—125)

The present invention relates to an improvement over the subject matter disclosed in applicant's Patent No. 2,655,964, issued October 20, 1953, for Screw Taper Drill Attachment.

The present invention relates to power drills, and has particular reference to a screw taper drill attachment for drilling a screw-receiving countersunk hole.

The principal object of the invention is to provide a screw taper drill attachment which has a non-rotating automatic stop device.

Another object of the invention is to provide a simple drill assembly, including a non-rotating stop device, which may be readily manufactured at low cost.

With the above and other objects and advantageous features in view, the invention consists of a novel arrangement of parts more fully disclosed in the detailed description following, in conjunction with the accompanying drawings, and more specifically defined in the claim appended thereto.

In the drawings,

Fig. 1 is a perspective view of an illustrative embodiment of the novel screw taper drill attachment;

Fig. 2 is a vertical section therethrough, showing the drill butt and the rotatable stop device in section;

Fig. 3 is a perspective view of the drill element;

Fig. 4 is a perspective view of the stop device;

Fig. 5 is a perspective view of the drill butt; and

Fig. 6 is a perspective view of the drill element blank.

It has been found desirable to provide a screw taper drill attachment with a rotatable stop device, to properly gauge the depth of drill and to prevent damage to, or marring of, the surface of the drilled material. To this end, I provide the drill attachment with a stop device which engages the surface of the drilled material and prevents further drilling, and which is rotatably mounted on the drill element so that it will not turn with the rotating drill to damage or mar the drilled surface.

Referring to the drawings, the drill attachment 10 includes a drill element 11, a stop device 12, and a butt 13 adapted to be mounted in a standard drill socket. The drill element 11 is preferably of flat sheet metal stock, stamped in the form of a blank 14, see Fig. 6, having a tang 15, a countersink 16, and a shank 17 having an upper linear portion 18 having parallel sides and a lower tapered portion 19 as illustrated, the lower tapered portion 19 being twisted into the contour of a screw as disclosed at 20 in Fig. 3, and the drill element being hardened in accordance with standard practice.

A round washer 21 preferably of sheet metal stock, see Fig. 4, is centrally bored as indicated at 22 and rotatably positioned over the tang 15, and a cylindrical butt blank 23 having a cylindrical bore 24, see Fig. 5, is placed on the tang 15 and locked in place in spaced relation to the upper surface 25 of the washer 21, as by welding 26, see Fig. 2, or by crimping or swaging, to permit free relative movement of the washer 21 and the tang 15.

The washer 21 thus constitutes a stop device of extended area, which engages a substantial portion of the surface of the material being drilled to stop further drilling action, but does not rotate, although the tang and the other drill parts may still continue to freely rotate. The stop device thus limits drilling action while remaining stationary, and does not mar or damage the drilled surface.

Although I have disclosed a specific embodiment of the invention, it is obvious that the novel non-rotating stop device may be applied to other types of drills, with or without countersinks, for limiting the depth of drilling, without departing from the spirit or the scope of the invention as defined in the appended claim.

I claim:

A drill attachment including a drill element of flat sheet stock with a tang, an upper countersink portion, an intermediate linear portion, and a lower twisted tapered portion conforming to the contour of a screw, a stop washer of extended area rotatably mounted on the tang and engaging the countersink portion, and a butt secured to the tang in spaced relation to the stop washer.

References Cited in the file of this patent

UNITED STATES PATENTS

| | | |
|---|---|---|
| 62,849 | Hofstatter | Mar. 12, 1867 |
| 548,385 | Nelson | Oct. 22, 1895 |
| 712,367 | Dummer | Oct. 28, 1902 |
| 843,936 | Galperin | Feb. 12, 1907 |
| 2,655,964 | Labbee | Oct. 20, 1953 |

FOREIGN PATENTS

| | | |
|---|---|---|
| 629,221 | Great Britain | Sept. 14, 1949 |